US010338381B2

(12) United States Patent
Tatsuno

(10) Patent No.: US 10,338,381 B2
(45) Date of Patent: Jul. 2, 2019

(54) IMAGE DISPLAY APPARATUS AND HEAD-UP DISPLAY SYSTEM

(71) Applicant: Hibiki Tatsuno, Kanagawa (JP)

(72) Inventor: Hibiki Tatsuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 137 days.

(21) Appl. No.: 15/637,989

(22) Filed: Jun. 29, 2017

(65) Prior Publication Data

US 2018/0003964 A1    Jan. 4, 2018

(30) Foreign Application Priority Data

Jun. 29, 2016   (JP) .................................. 2016-129037

(51) Int. Cl.
| | | |
|---|---|---|
| G02B 27/01 | (2006.01) | |
| G03B 21/14 | (2006.01) | |
| H04N 9/31 | (2006.01) | |
| G03B 21/20 | (2006.01) | |
| B60K 35/00 | (2006.01) | |
| B60K 37/04 | (2006.01) | |

(52) U.S. Cl.
CPC .............. G02B 27/01 (2013.01); B60K 35/00 (2013.01); B60K 37/04 (2013.01); G02B 27/0172 (2013.01); G03B 21/208 (2013.01); H04N 9/3152 (2013.01); *G02B 2027/013* (2013.01); *G02B 2027/0185* (2013.01)

(58) Field of Classification Search
CPC ...... G03B 21/14; G03B 21/008; G02B 27/01; G02B 27/0101; G02B 27/0172; G02B 2027/011; G02B 2027/013; H04N 9/3152; H04N 9/3108
See application file for complete search history.

(56) References Cited

U.S. PATENT DOCUMENTS

| | | |
|---|---|---|
| 2011/0141536 A1 | 6/2011 | Tatsuno |
| 2011/0310450 A1 | 12/2011 | Amada et al. |
| 2012/0154768 A1 | 6/2012 | Tatsuno |
| 2012/0162753 A1 | 6/2012 | Tatsuno |
| 2013/0070217 A1 | 3/2013 | Tatsuno |
| 2013/0107233 A1 | 5/2013 | Hirakawa et al. |
| 2013/0107234 A1 | 5/2013 | Nishina et al. |

(Continued)

FOREIGN PATENT DOCUMENTS

JP    2015-023646    2/2015

*Primary Examiner* — William C. Dowling
(74) *Attorney, Agent, or Firm* — Oblon, McClelland, Maier & Neustadt, L.L.P.

(57) ABSTRACT

An image display apparatus includes an image forming element, an illumination optical system that guides light emitted from a light source to the image forming element, and a plurality of lenses that project a trapezoidal image formed by the image forming element onto a projected surface. The plurality of lenses have an optical axis that is at an inclination of 1° or more with respect to a perpendicular of a plane including an image forming surface of the image forming element. First rays of the light have a first focal point and second rays of the light have a second focal point. The first focal point is farther from the image forming element than the second focal point is from the image forming element. The first rays form the first portion of the trapezoidal shape and the second rays form the second portion of the trapezoidal shape.

20 Claims, 11 Drawing Sheets

(56) References Cited

U.S. PATENT DOCUMENTS

| | | |
|---|---|---|
| 2013/0114053 A1 | 5/2013 | Tatsuno et al. |
| 2014/0118818 A1 | 5/2014 | Nishina et al. |
| 2014/0126045 A1 | 5/2014 | Tatsuno et al. |
| 2014/0146295 A1 | 5/2014 | Tatsuno |
| 2014/0160545 A1 | 6/2014 | Tatsuno |
| 2014/0218699 A1* | 8/2014 | Tatsuno ............... G03B 21/147 353/98 |
| 2014/0340658 A1 | 11/2014 | Takano et al. |
| 2015/0002912 A1 | 1/2015 | Tatsuno |
| 2015/0029474 A1 | 1/2015 | Tatsuno |
| 2015/0062696 A1* | 3/2015 | Tatsuno ................ G02B 17/08 359/364 |
| 2015/0138518 A1 | 5/2015 | Tatsuno |
| 2015/0138625 A1 | 5/2015 | Tatsuno |
| 2015/0234158 A1* | 8/2015 | Tatsuno ................ G02B 13/16 359/364 |
| 2016/0077420 A1 | 3/2016 | Tatsuno |
| 2016/0103304 A1 | 4/2016 | Takano et al. |
| 2016/0231542 A1 | 8/2016 | Tatsuno et al. |
| 2017/0059971 A1 | 3/2017 | Takano et al. |
| 2017/0064268 A1 | 3/2017 | Shibayama et al. |

\* cited by examiner

FIG. 3A
FIG. 3B
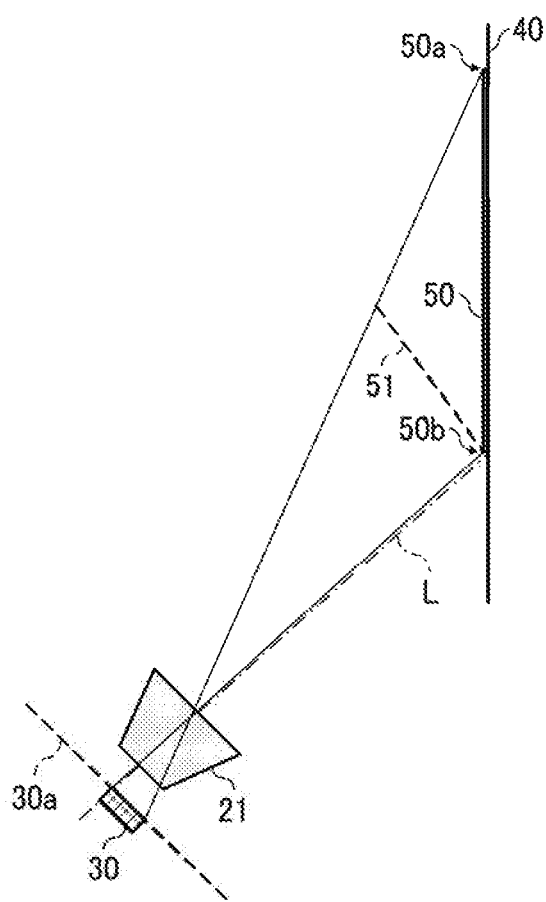
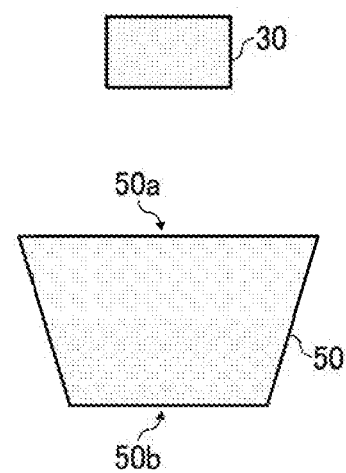

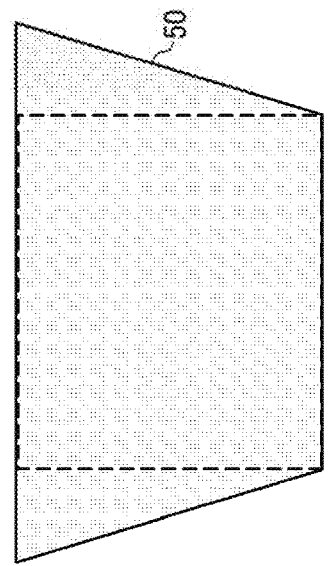
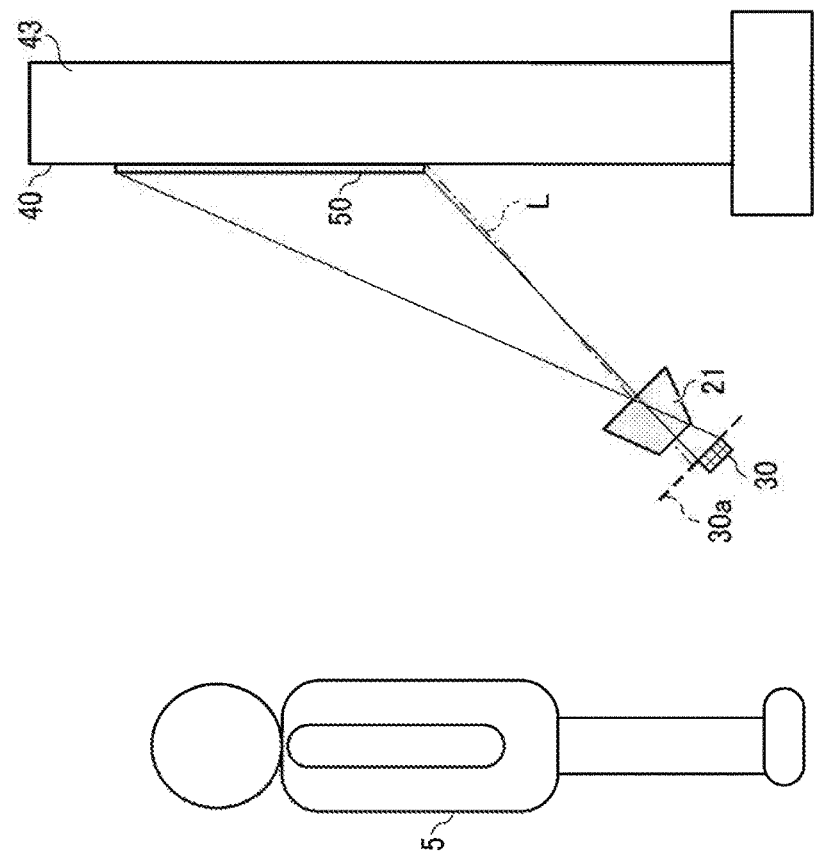

IMAGE DISPLAY APPARATUS AND HEAD-UP DISPLAY SYSTEM

CROSS-REFERENCE TO RELATED APPLICATIONS

The present application claims priority to Japanese Patent Application No. 2016-129037, filed in Japan on Jun. 29, 2016, the entire contents of which is hereby incorporated by reference.

BACKGROUND

An image forming device generally is commonly referred to as an image display device or a "projector," such projectors may include a cathode ray tube (CRT) projector, a liquid crystal projector, or a DMD (Digital Micro mirror Device) projector. A DMD is a reflection type image forming device or image display device. A DMD includes a plurality of micromirrors arranged in a two dimensional array that turns the reflected light on and off by changing a tilt angle of each individual micromirror.

A projector has been used for information sharing at office and school and watching movies and other images. Recently, it is used for digital signage that displays advertisements and guidance on electronic media and is also used in a head-up display (HUD) system which projects an image on a small screen arranged in a car. Such a head-up display system causes the driver to observe, the image via a concave mirror and a windshield of the car.

However, a projector used for digital signage has a problem that an image projected on a projected surface becomes trapezoidal and a focus of the projector becomes unbalanced at the top and bottom of the image when the projected surface is inclined with respect to the optical axis in the case of oblique projection. When focusing on the bottom edge of the image, the top edge of the image will not be in focus, so a method to reduce the focus imbalance by focusing on the center of the image is used.

In a projector for an automobile HUD, it is sometimes preferable that the image projected on the small screen has a trapezoidal shape. The image to be projected is, for example, a speedometer, a road sign, or the like, and the unbalance of focus of the image is required to be minimal.

As a method for eliminating the imbalance in focus of the image, a method of adjusting the optical system to satisfy the Scheimpflug condition may be used. For example, by tilting the image plane (image forming element) in accordance with the inclination of the object plane (projected plane), it is possible to focus on the entire area to be projected. The amount of tilting the image forming element is proportional to the magnification of the lens system.

On the other hand, in the design of the illumination optical system of the general projector, it is required to uniformly illuminate the image forming element. For example, an optical system that illuminates an image forming device using a light tunnel, and shows a configuration of an illumination optical system for forming a real image at the exit of the light tunnel on the image forming device.

A configuration using a fly's eye lens may also be used. A system in which light from a light source is once divided into a plurality of light fluxes by a fly's eye lens and is converted into a single bundle of rays again on the image forming element, thereby achieves uniform illuminance. Also in this case, the lens between the fly's eye lens and the image forming element is designed so as to be in focus on the entire image forming surface of the image forming element, and the image forming element is uniformly illuminated.

As a sight mixing element, the method of making the light amount uniform is different between a light tunnel and a fly-array lens, but in either case, there is a condensing optical system composed of a lens or a mirror between the light mixing element and the image forming element. As described above, in a general projector, it is proposed that a technique of projecting an image having a uniform illuminance distribution onto the projected surface by making the illuminance distribution on the image forming element uniform.

However, in a case where the projected surface is inclined with respect to the optical axis of the projection optical system and the image to be intentionally projected is trapezoidal (for example, digital signage or projection in a HUD system for automobiles), if the illuminance on the image forming element is uniform, the illuminance distribution of the projected image becomes unbalanced.

Since the illuminance is a value obtained by dividing the light quantity by the area, the illuminance on the short side of the trapezoidal shape image is high and the illuminance on the long side is low, so that for the observer, the short side is bright and the long side It will be visually recognized as a dark unbalanced image.

Accordingly, an object of the present application is to provide an image display device capable of eliminating an imbalance in illuminance distribution caused by a trapezoidal shape when the projected image is a trapezoidal shape.

SUMMARY

An image display apparatus in accordance with the present application comprises a light source, an image forming element on which a plurality of micromirrors are arranged, an illumination optical system for guiding light entitled from the light source to the image forming element, and a projection optical system having a refractive optical system including a plurality of lenses sharing an optical axis and projecting an image formed by the image forming element onto a projected surface.

The optical axis of the refractive optical system has an inclination of 1° or more with respect to a perpendicular of a plane including an image forming surface of the image forming element. The image projected on the projected surface is a trapezoidal shape that includes a first portion and a second portion, the first portion is parallel to the second portion and the second portion is longer than the first portion. The illumination optical system includes a condenser lens and a field lens as a condensing optical system, the condenses lens is between the field lens and the light source. A focal point of the condensing optical system is closer to the field lens than to the image forming surface of the image forming element.

First rays of the light have a first focal point and interact with a first side of the image forming element. Second rays of the light have a second focal point and interact with a second side of the image forming element. The first focal point is farther from the image forming element than the second focal point is from the image forming element. The first rays form the first portion of the trapezoidal shape and the second rays form the second portion of the trapezoidal shape.

A head-up display system in accordance with the present application comprises an image forming element, an illumination optical system that guides light emitted from a light source to the image forming element, a plurality of lenses that project a trapezoidal image formed by the image forming element, and an observation imaging optical system forming a virtual image based on the trapezoidal image. The observation optical system includes a concave mirror for enlarging and projecting the trapezoidal image toward a transmissive reflective member.

The plurality of lenses have an optical axis that is at an inclination of 1° or more with respect to a perpendicular of a plane including an image forming surface of the image forming element. The trapezoidal image includes a first portion and a second portion, the first portion is parallel to the second portion and the second portion is longer than the first portion. The illumination optical system includes a condenser lens and a field lens, the condenser lens is between the field lens and the light source. First rays of the light have a first focal point and interact with a first side of the image forming element. Second rays of the light have a second focal point and interact with a second side of the image forming element.

The first focal point and the second focal point are closer to the field lens than to the image forming surface of the image forming element. The first focal point is farther from the image forming element than the second focal point is from the image forming element. The first rays form the first portion of the trapezoidal shape and the second rays form the second portion of the trapezoidal shape.

The above and other objects, features, advantages and technical and industrial significance of this application will be better understood by the following detailed description, when considered in connection with the accompanying drawings.

BRIEF DESCRIPTION OF THE DRAWINGS

FIG. 3A shows of a projection of an image onto a screen with the projector of FIG. 1;

FIG. 3B shows a trapezoidal image projected onto a surface by the projection in FIG. 3A;

FIG. 4A is an explanatory diagram showing an overview of digital signage;

FIG. 4B illustrates a trapezoidal image projected onto a surface by the projection in FIG. 4A;

DETAILED DESCRIPTION OF THE DRAWINGS

Hereinafter, an image display device and a HUD system will be described with reference to the drawings.

First, a general configuration of a projector including a reflective image forming element will be described with reference to FIG. 1.

Figure 1:
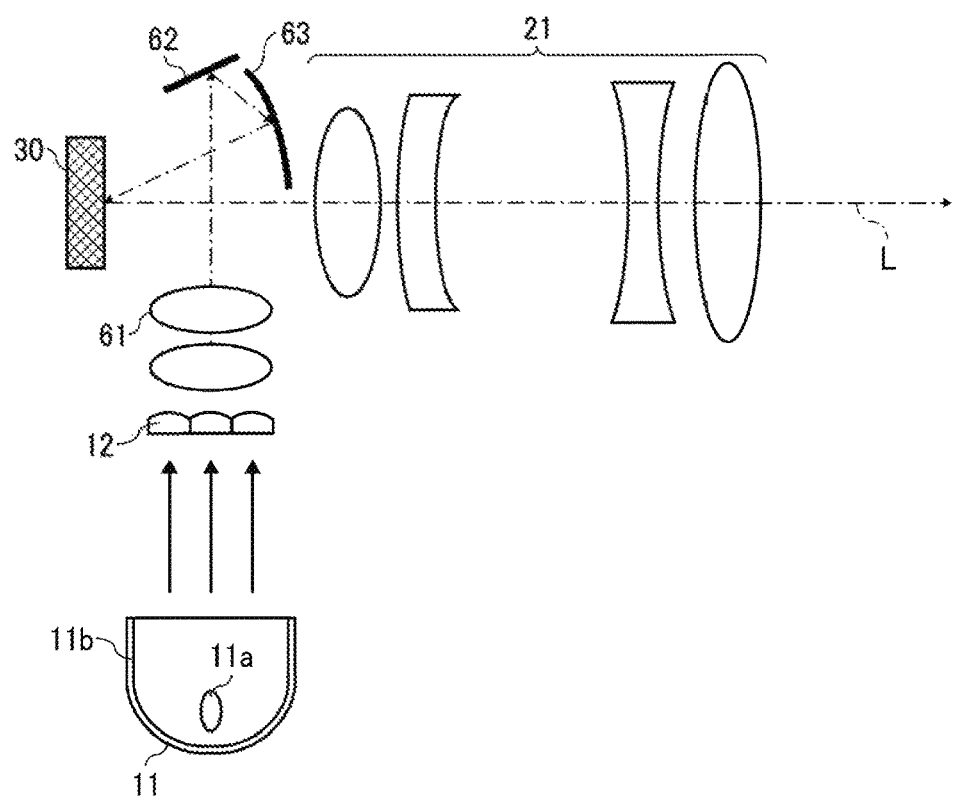
FIG. 1 is an explanatory diagram showing a general configuration of a projector including a reflective image forming device.

FIG. 1 shows an optical engine inside a projector. An image forming element 30, which may be a DMD, is illuminated with light from lamp 11a of light source 11, and an enlarged image of the image forming element 30 is projected onto a projected surface (hereinafter also referred to as "screen") by a projection optical system.

Specifically, the light from the lamp 11a is made into a parallel beam by reflector 11b and to be incident on fly-eye lens 12 as the light mixing element.

The incident light is divided into a plurality of light beams by the fly-eye lens (lens array) 12, and is converged again as one light bundle on the image forming surface on the image forming element 30 by illumination lens 61, mirror 62, and curved mirror 63.

By dividing the light source light having unevenness in light quantity into a plurality of light bundles and then forming one light bundle again, the illuminance distribution of the image forming element 30 is in a uniform state without uneven light quantity. Since the image forming element 30 has a uniform illuminance distribution, the illuminance distribution of the image projected on the screen as the enlarged image also becomes uniform.

The image forming element 30 is a device composed of a plurality of micromirrors, and the angle of each mirror is changed from, for example, +12° to −12°. For example, when the angle of the mirror is −12°, the reflected light of the illumination light enters the projection lens, and when it is +12°, the reflected light of the illumination light is set not to enter the projection lens. In this way, by controlling the angle of each mirror of the image forming element 30, it is possible to form a digital image on the screen 40.

In the example of the general image display apparatus shown in FIG. 1, the projection optical system includes a refractive optical system 21 composed of four lenses.

The refractive optical system 21 is a coaxial optical system sharing the optical axis of each lens. That is, the light beam reflected by the image forming element 30 and the optical axis L shared by each lens of the refractive optical system are on the same straight line.

In the image display apparatus o described later, a perpendicular line of the plane including the image forming surface of the image forming element and the optical axis L of the refractive optical system are not on the same straight line. The optical axis L has an inclination of 1° or more with respect to the perpendicular of the plane including the image forming surface.

This is similar to a case where the optical path is disposed between the image forming element and the refractive optical system.

Figures 2A, 2B:
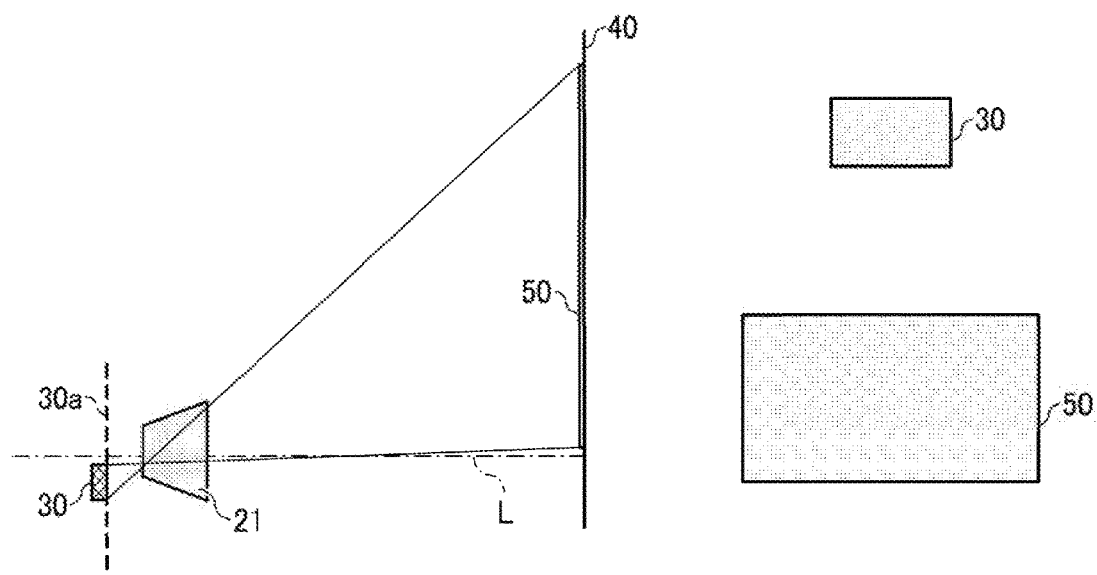
FIG. 2A is an explanatory diagram schematically showing a manner in which an image is projected on a screen by the image forming device.
FIG. 2B illustrates a shape of an image projected on the screen when observed from a front of the screen.

FIG. 2A schematically shows how the image 50 is projected on the screen 40 by extracting only the image forming element 30 and the reflective optical system 21 of the projector in FIG. 1.

When the image 50 is projected below the height of the table on which the projector is installed, the light may be shielded from light. Therefore, the general projector is designed such that the image forming element 30 is disposed at a position not crossing the optical axis L of the refractive optical system 21 (so that it intersects the optical axis L at the plane 30a including the image forming surface of the image forming element 30), and the image 50 is projected above the optical axis L.

FIG. 2B shows what kind of shape the image 50 formed by the image forming element 30 is projected on the screen when the screen 40 of FIG. 2A is observed from the front. Since both the image forming surface of the image forming element 30 and the screen 40 are perpendicular to the optical axis L, a rectangular image 50 of a similar shape of the image forming element 30 is naturally projected on the screen 40.

FIG. 3A schematically shows a state in which oblique projection is performed using the projector of FIG. 1. FIG. 3B shows a trapezoidal image projected onto a surface by die projection in FIG. 3A.

In FIG. 3A, the image forming element 30 and the refractive optical system 21 are arranged so that the lower end 50a of the image is in focus, but the focus of the entire image is on the plane perpendicular to the optical axis L (dotted line indicated by reference numeral 51 in FIG. 3A), so that the upper end 50b of the image is out of focus.

Such unbalance of focus is a significant problem in a projector for digital signage requiring a short projection distance and a projector for a HUD system of an automobile which is required to be able to visually recognize a displayed image accurately. The outline of these will be described below.

FIGS. 4A and 4B illustrate an overview of digital signage. FIG. 4A schematically shows a state in which the image 50 is projected on the screen 40 provided on the guide plate 43, and the pedestrian 5 or the like recognizes this.

Although the image 50 projected on the screen has a trapezoidal shape, it is possible to display the entire trapezoidal shape image shown by the solid line in FIG. 4B or only the rectangular shape of a part of the trapezoidal shape image indicated by the dotted line in FIG. 4B.

Since the digital signage can project an image onto an arbitrary projected surface by the projector, it is possible to use a small projector unlike a rear projection television of a general rear projection projector which requires almost the same size as the screen, Convenience is also excellent on the transport surface.

Projectors for digital signage applications require short projection distances. However, as shown in FIG. 7, the shorter the projection distance is the more the unbalance in focus is expanded.

Figure 7:
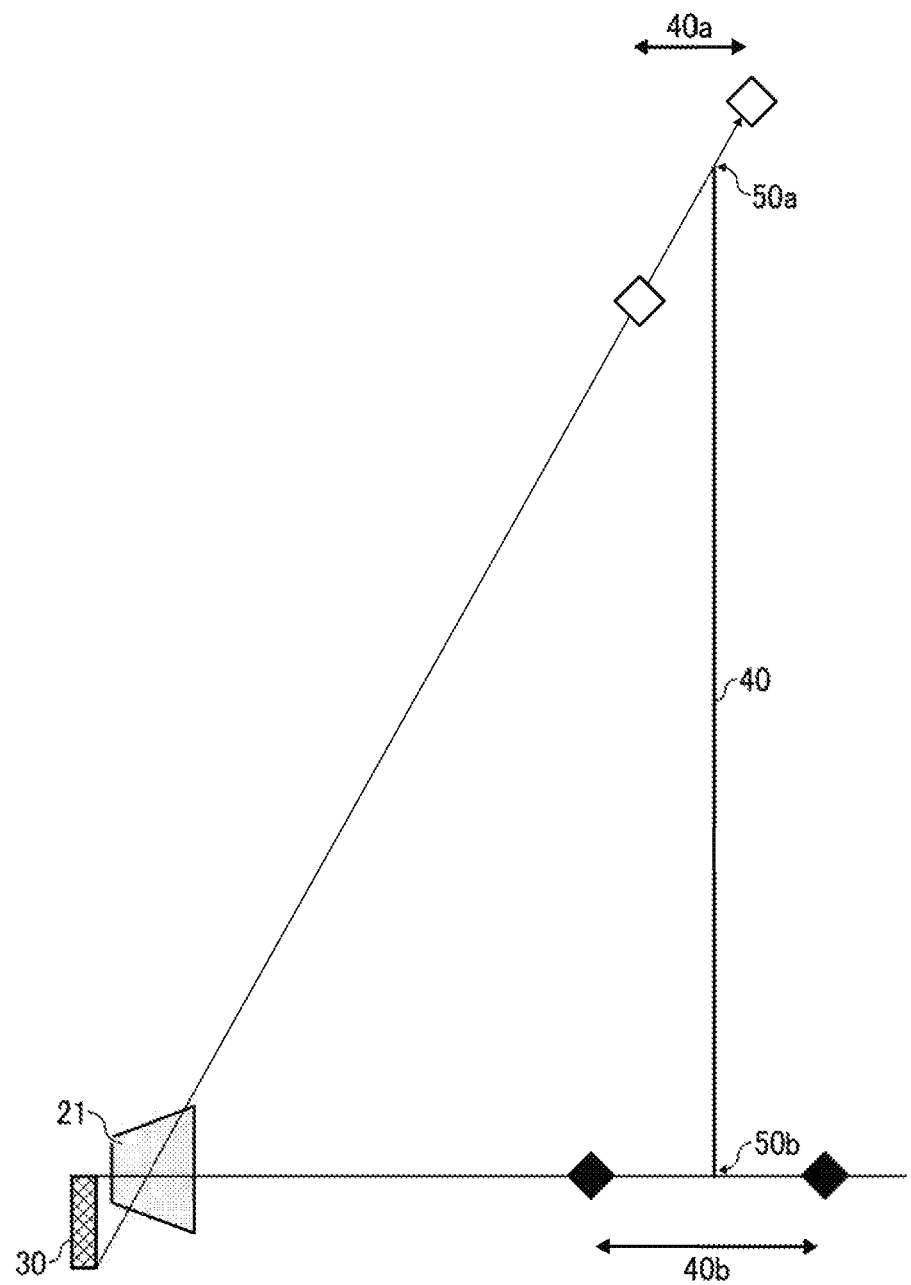
FIG. 7 is an explanatory view of a depth of an image projected by an image display device with a short projection distance.

FIG. 7 is a view showing defocus range (the depth of focus) of the image 50 projected by the short projection distance projector.

In the lower end 50b of the image, since light rays are vertically incident on the screen 40, the image of constant quality (the range in which it is in focus) is the distance itself between "♦" and "♦" in FIG. 7. On the other hand, at the image upper end 50a, since light rays diagonally enter the screen 40, the depth in the screen vertical direction is a value obtained by multiplying "◇" and "◇" by the cosine, of the incident angle, as indicated by an arrow 40b in FIG. 7, is shorter than the lower end arrow 40b. The depth difference between the image upper end 50a and the image lower end 50b is enlarged as the projection distance (the distance between the refractive optical system 21 and the screen 40 in FIG. 7) is shortened. Therefore, when such a projector is used for a digital signage application, the focus imbalance shown in FIG. 3A becomes worse.

Figure 5:
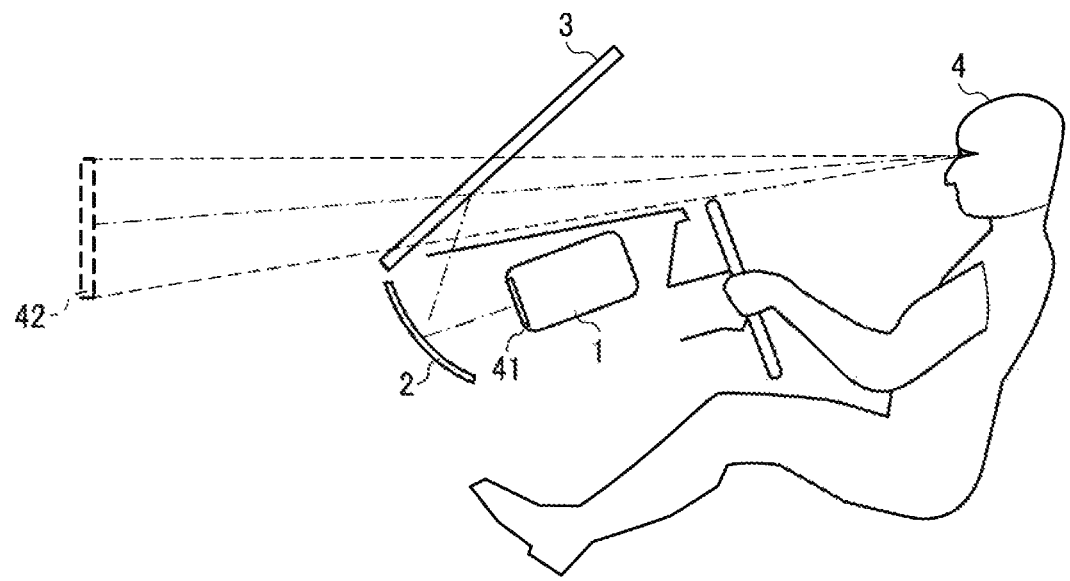
FIG. 5 is a schematic configuration diagram of a HUD system of an automobile.

FIG. 5 is a schematic configuration diagram of a HUD system of an automobile. As shown in FIG. 5, the HUD system includes an image display device (small size projector) 1 is disposed and the image projected on the small screen 41 is projected onto the windshield 3 through an observation optical system such as a concave mirror 2, so that the driver 4 can recognize the windshield 3 and recognize it as a virtual image ahead of it.

It is preferable for the compact projector 1 to project the trapezoidal image onto the small screen 41, for example, in order to accommodate the projector in a small enclosure inside the vehicle body, or in order to form an image of a trapezoidal shape opposite to the trapezoidal shape generated by the free-form surface shape of the glass 3. In either case, an imbalance in focus of the image is required to be minimal.

Figure 6:
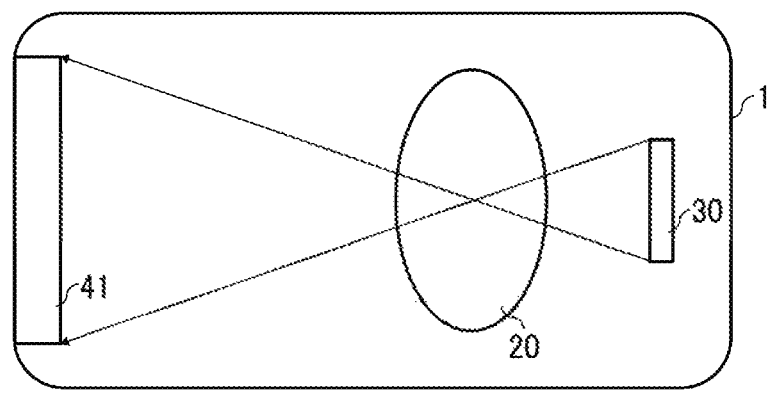
FIG. 6 is a schematic configuration diagram of an image display device constituting a HUD system.

In order to eliminate the imbalance of focus in a trapezoidal image, the optical system may be adjusted so as to satisfy the Scheimpflug condition. The focus imbalance as described with reference to FIG. 3A could be resolved by disposing the image forming element 30 of the projector, as shown in FIG. 4A and FIG. 6, at an angle with respect to the optical axis L of the refractive optical system 21 constituting the projection optical system 20.

Figure 8A:
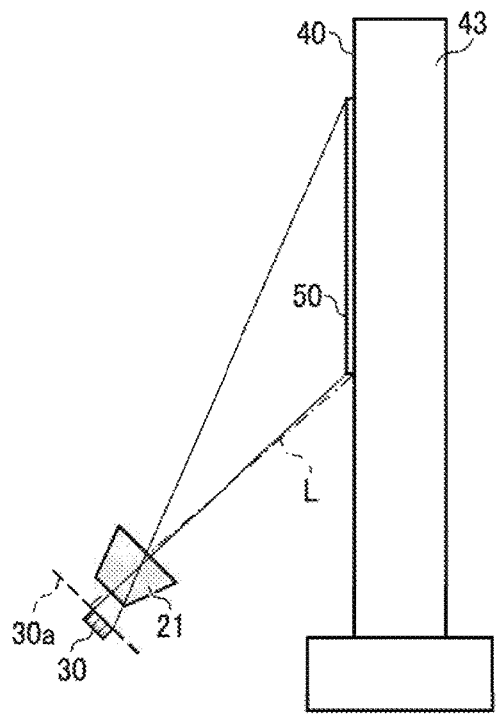
FIG. 8A shows a projection of a trapezoidal image by a projector onto a screen.
Figure 8B:
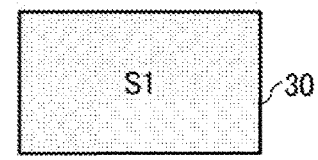
FIG. 8B shows an image forming element of the projector in FIG. 8A.
Figure 8C:
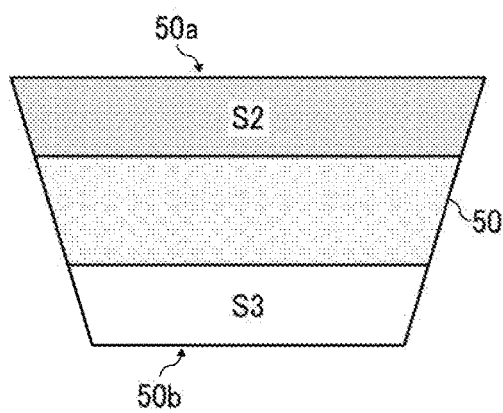
FIG. 8C shows the trapezoidal image projected onto the screen in FIG. 8A.

As shown in FIG. 8A, the screen 40 is tilted with respect to the optical axis L of the refractive optical system 21, in the case where a trapezoidal image as shown in FIG. 8C is projected, as shown in FIG. 8B if the illuminance S1 on the image forming element is uniform, the light quantity is equal at any position in the trapezoidal shape image. Although, since the illuminance is a value obtained by dividing the light amount by the area, as shown in FIG. 8C, the illuminance S3 on the short side 50b side having a small area is high and the illuminance S2 on the long side 50a side with a large area is low. In this way, it is necessary to eliminate the imbalance in the illuminance distribution in the trapezoidal image, but it can be solved by the configuration described below.

Figure 9A:
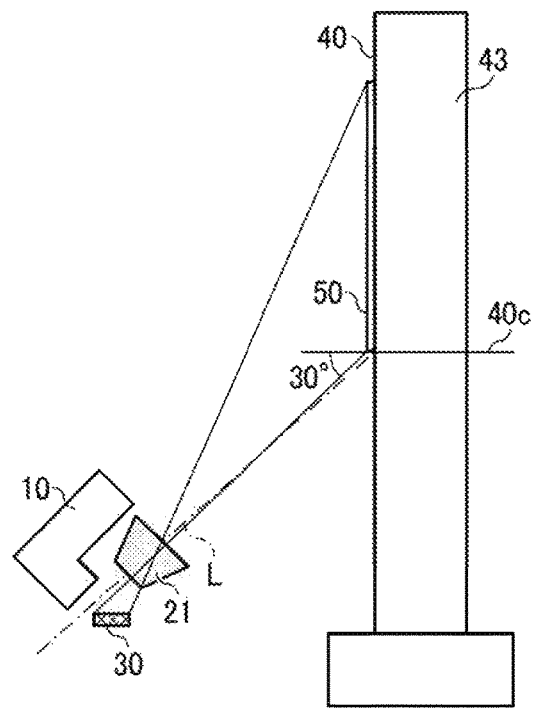
FIG. 9A shows a projection of a trapezoidal image by an image display device onto a screen.
Figure 9B:
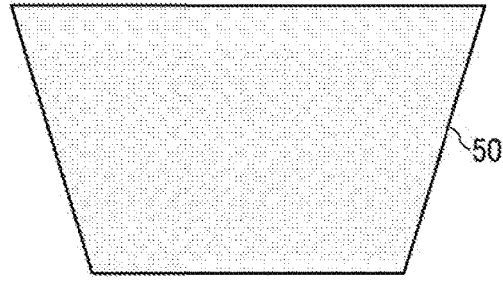
FIG. 9B shows the trapezoidal image projected onto the screen in FIG. 9A.
Figure 10:
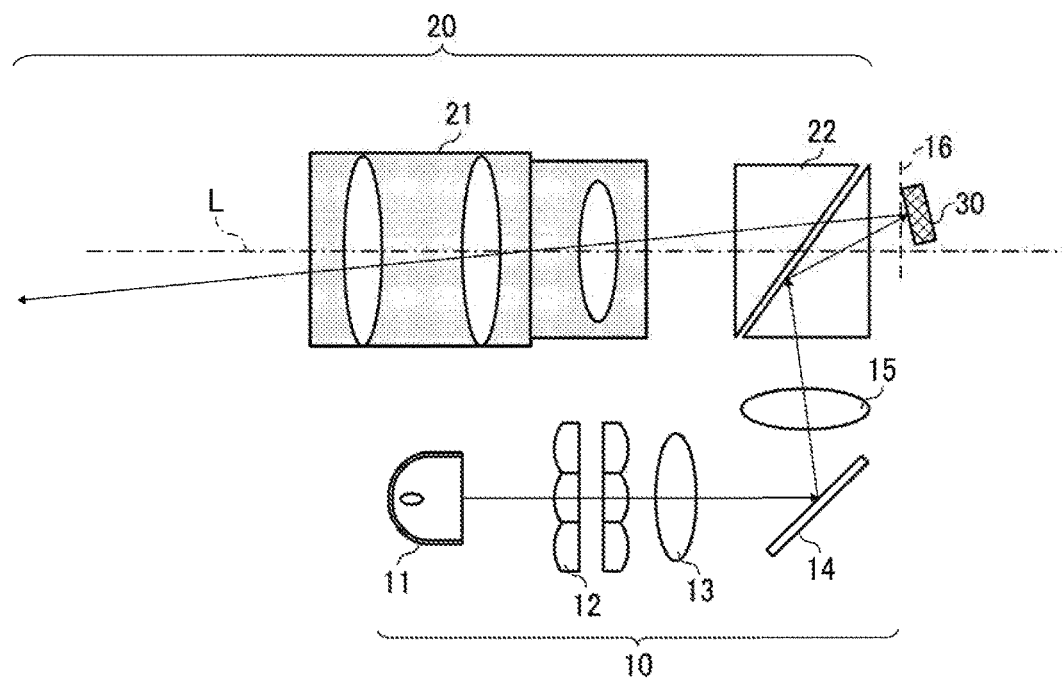
FIG. 10 is a schematic diagram showing a configuration of an image display device.

FIGS. 9A and 9B schematically illustrate projection of an image by an image display device and FIG. 10 shows the image display device of the present application.

As shown in FIG. 9A, the image display apparatus projects an enlarged image of the image forming element 30, which is an image forming element, on the screen 40 as a projected surface by the refractive optical system 21. As shown in FIG. 9B, the image 50 projected on the screen 40 has a trapezoidal shape.

In order to eliminate the focus unbalance of the image 50, the perpendicular line to the plane including the image forming surface of the image forming element 30 is inclined with respect to the optical axis L.

The inclination angle of the image terming element 30 (θ1) can be calculated using the inclination angle of the screen 40 (θ2, the inclination angle of the perpendicular line 40c to the plane including the image forming surface with respect to the optical axis L) and the value of the lateral magnification of the refractive optical system 21 (M) on the basis of the following equation (1) (Scheimpflug condition formula):

$$\tan(θ2)=(M)\times\tan(θ1) \quad (1)$$

When the inclination angle of the screen with respect to the optical axis L is 30° (=θ2) and the lateral magnification of the refractive optical system 21 is 30 times(=M), the obtained value is 1.1° (=θ1).

That is, by setting the inclination angle of the image forming element 30 (the inclination angle of the perpendicular line to the plane including the image forming surface with respect to the optical axis L) to 1.1°, the imbalance of locus is eliminated.

In FIGS. 9A and 10, the inclination of the image forming element 30 is exaggerated.

As shown in FIG. 10, the image display device includes a light source 11, an image forming element 30 in which a plurality of micromirrors are arranged, an illumination optical system 10 for guiding the light emitted from the light source 11 to the image forming element 30, and a projection optical system 20 having a refractive optical system 21 composed of a plurality of lenses sharing an optical axis L for projecting an image formed by the image forming element 30 onto a projected surface.

The optical axis of the refractive optical system 21 has an inclination of 1° or more with respect to the perpendicular line to the plane including the image forming surface of the image forming clement 30 and the image projected on the projected surface is in a trapezoidal shape In the illumination optical system 10, the light from the light source 11 is incident on a fly-eye lens 12 which is an optical mixing element.

The incident light is divided into a plurality of light bundles by a fly-eye lens (lens array) 12, and then converged as one light bundle again on the image formation surface on the image forming element 30 via a condensing optical system.

The illumination optical system 10 has a condenser lens 13 and a field lens 15 as a condensing optical system and is disposed in this order from the light source 11 side.

The focal point of the focusing optical system (the point where rays converge when the parallel light is incident on this light collecting optical system) is a position shifted toward the field lens 15 side from the image forming surface of the image forming element 30. The amount of shift of the focal point 16 toward the field lens 15 side is small on the side where the long side of the trapezoid shape is projected when projected on the projected surface and large on the side on the short side when projected on the projected surface.

That is, the focal point as rays converge onto image forming element 30 from field lens 15, a first focal point of the rays on a first side of image forming element 30 is further from image forming element 30 than a second focal point of the rays on a second side of image forming element 30. Rays with the first focal point, on the first side of image forming element 30, interact with image forming element 30 and form a small side of the trapezoid shape. Rays with the second focal point, on the second side of the image forming element 30, interact with image forming element 30 and form a long side of the trapezoid shape. Thus, an amount of shift of a focal point of rays on the first side of image forming element 30 is large while an amount of shift of a focal point of rays on the second side of image forming element 30 is small.

In addition to the refractive optical system 21, the projection optical system 20 may include a total reflection prism, a bending mirror, and the like.

As shown in FIG. 10, in the aspect in which the projection optical system 20 has the total reflection prism 22 between the image forming element 30 and the refractive optical system 21, the optical axis L of the refractive optical system 21 which is bent by 90° by the total reflection prism 22 and esters the image terming element 30 has an inclination of 1° or more with respect to the perpendicular line to the plane including the image forming surface of the image forming element 30.

In the image display apparatus, the focal point 16 of the condensing optical system is set near the side close to the refractive optical system 21 of the image forming element 30. Consequently, the focusing optical system is in focus on the side close to the refractive optical system 21 of the image forming element 30, the out of focus state is at the side far from the side, the illuminance on the near side is high, and the illuminance on the far side is low. In this way, illuminance imbalance of the projected trapezoidal shape image can be eliminated.

In addition, the condenser lens 13 and the field lens 15 of the illumination optical system are preferably lenses having positive refractive power. As a result, the curvature of field at the focal point 16 can be maximized, so that blurring on the short side of the trapezoidal shape image is induced on the image forming element 30, the illuminance is lowered, and the illuminance distribution of the image projected on the screen 40 the imbalance can be neutralized.

Furthermore, by preventing the folding mirror 14 and the total reflection prism 22 from having refractive power, the field curvature at the focal point 16 is set in a direction in which the image side of the image forming element 30 is in focus with respect to the light source side, and the image forming element 30 on the surface farther from the dioptric system, more out of focus will proceed and illuminance lowering due to the low degree of convergence of light can be generated.

Here, in the aspect of image projection by the image display device shown in FIG. 9A, a ease where the distance to the screen 40 is further shortened and the lateral magnification of the refractive optical system 21 is reduced to 20 times will be described.

In this case, if the inclination angle of the image forming element 30 (the inclination angle with respect to the optical axis L of the perpendicular line to the plane including the image forming surface), for eliminating the focus imbalance is calculated based on the above-described formula 1 (Scheimpflug conditional expression), when, the inclination of the screen normal line 40c with respect to the optical axis L is 30° and the lateral magnification of the refractive optical system 21 is 20 times, the obtained value is 1.7°.

That is, by setting the inclination angle of the image forming element 30 (the inclination angle of the perpendicular to the plane including the image formation surface with respect to the optical axis L) of 1.7°, the imbalance in focus is eliminated.

As the inclination angle is changed, the positional relationship between the focal point 16 of the illumination optical system and the image forming surface of the image forming element 30 also changes. Since the fulcrum supporting the tilt of the image forming element 30 is the point nearest to the optical axis L, the point where the tilt of the image forming element 30 moves the greatest is the point illuminated so that the illuminance becomes the highest. Therefore, the illuminance distribution also changes remarkably.

Therefore, the image display apparatus is provided with a folding mirror 14 that can change the angle of the light ray incident on the image forming element 30 according to the inclination of the image forming element 30 as a light converging optical system.

By changing the inclination of the folding mirror 14, it is possible to move the focal point 16 of the illumination optical system in the vertical direction in FIG. 10, and it is possible to adjust so that a desired illuminance distribution can be obtained on the image forming element 30.

It is preferable that the tilt angle of the return mirror 14 is adjusted not by the structure supporting the same, but by separately arranging an indirect member and changing the configuration of the indirect member.

Figure 16A:
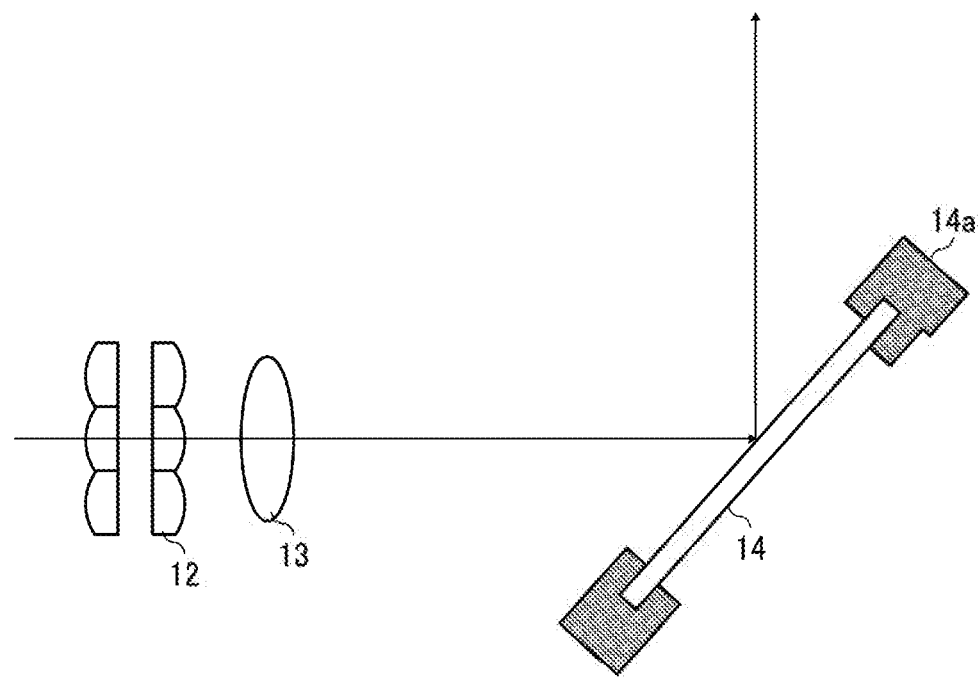
FIG. 16A is an explanatory view showing an example of an indirect member provided in a folding mirror.
Figure 16B:
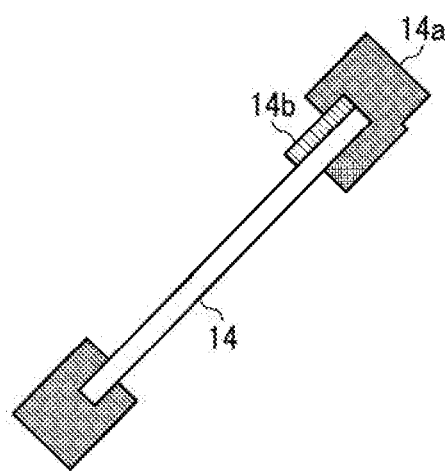
FIG. 16B is another explanatory view showing an example of an indirect member provided in a folding mirror.

FIG. 16A shows a state where the folding mirror 14 is held by foe holding member 14a schematically. The holding member 14a is not involved in changing the inclination angle, and the inclination angle is changed by the indirect member 14b shown in FIG. 16B.

The indirect member 14b is a thin plate like member arranged so as to be sandwiched between the reflecting surface of the folding mirror 14 and the holding member 14a.

By appropriately adjusting the thickness of the indirect member 14b (for example, by appropriately selecting from the plurality of indirect members 14b having different thicknesses), it is possible to adjust the turning mirror 14 so as to have a desired inclination angle.

Figure 11A:
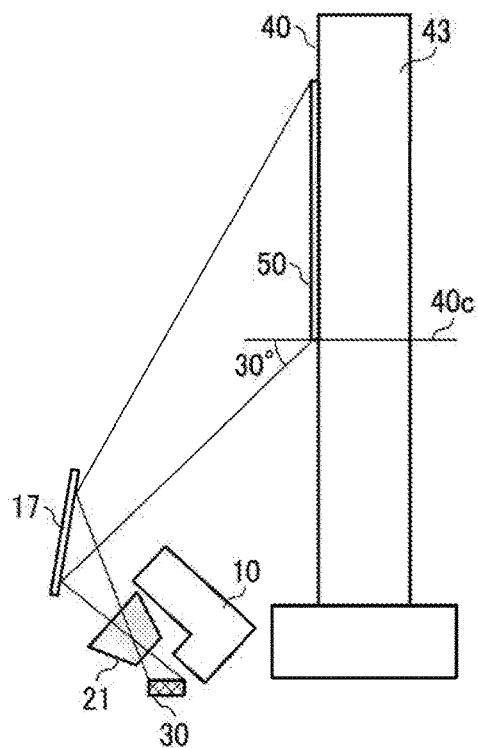
FIG. 11A shows a projection of a trapezoidal image by an image display device onto a screen.
Figure 11B:
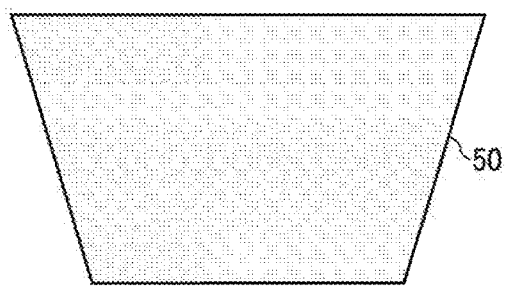
FIG. 11B shows the trapezoidal image projected onto the screen in FIG. 11A.

FIGS. 11A and 11B illustrate projection of an image by an image display device. As shown in FIGS. 11A and 11B the image display apparatus further includes a folding mirror 17 that bends the light from the refractive optical system 21 and leads the light to the screen 40 as a projected surface.

The reflectance of the folding mirror 17 is such that the reflectance of the principal ray reaching the short side of the trapezoidal image projected on the screen 40 is smaller than the reflectance of the main ray reaching the long side.

Here, the main light rays reaching the short side of the trapezoidal shape image 50 projected on the screen 40 and the main light rays reaching the long side mean light rays that have passed through the aperture center of the aperture stop of the lens barrel.

The aperture diaphragm of the lens barrel is one of the light shielding means provided on the lens barrel which accommodates and hold s the plurality of lenses of the refractive optical system 21 and regulates the brightness of the optical axis L of the refractive optical system 21. The light beam that has passed through the center of the aperture diaphragm means a light beam that can pass when the aperture stop is made to a small aperture diameter to an extreme.

As the folding mirror 17 for example, it is preferable that an antireflection coating having reflectance different for each incident angle of light is set on the aluminum mirror surface.

Generally, as the angle of incidence of light on the mirror increases, the reflectance decreases. However, in the folding mirror 17 of the image display apparatus, on the contrary, as the incident angle of light to the mirror is larger, the reflectance may be set to be lower as the light ray incidence angle is smaller.

In the folding mirror 17, the imbalance in the illuminance distribution of the trapezoidal shape image can be eliminated b making the reflectance of the light ray going to the short side smaller than the reflectance of the light ray going to the long side.

The folding mirror 17 is not a large sized mirror close to a screen size like a rear projection television, but a small mirror arranged in the vicinity of the refractive optical system 21.

Figure 12:
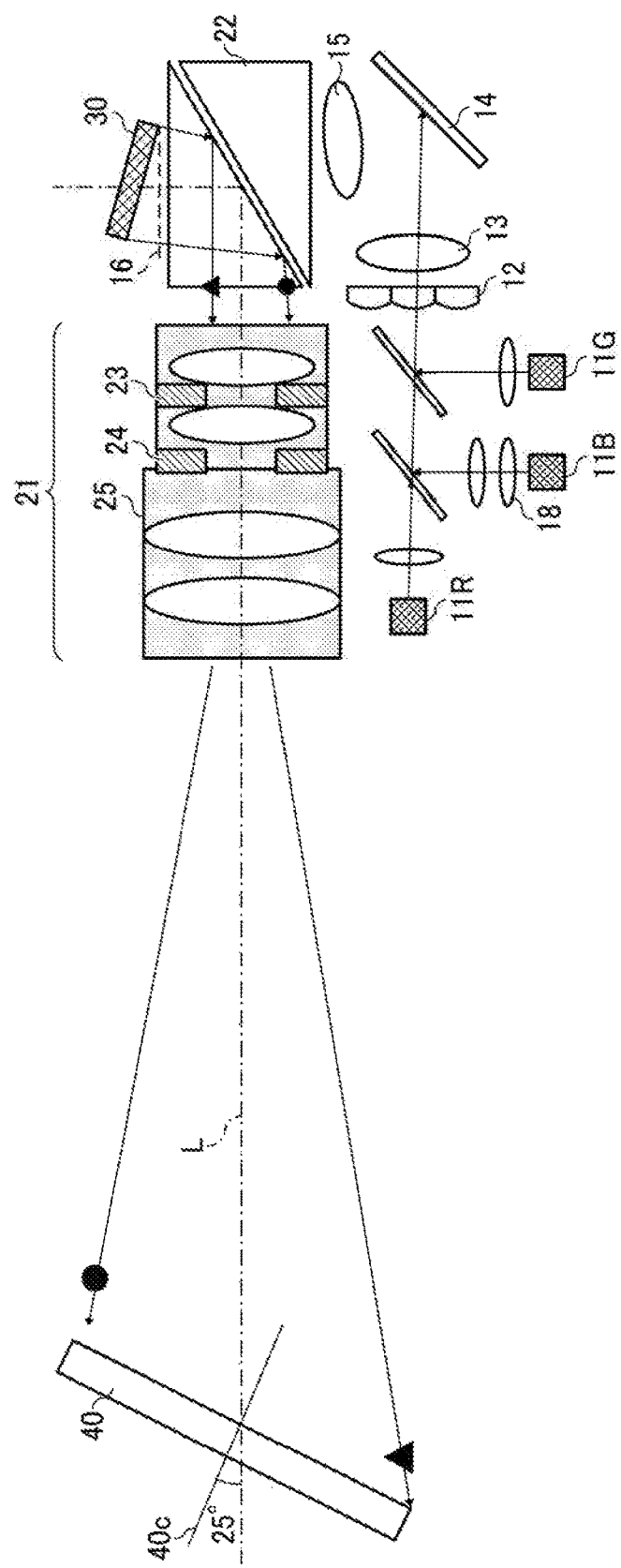
FIG. 12 is a schematic diagram showing a configuration of an image display device in a HUD.

The image display device may further comprise a small projector (virtual image observation device) constituting a HUD system for automobiles, as illustrated in FIGS. 5 and 12.

Such a head-up display system includes the image display device, and an observation imaging optical system for forming a virtual image based on an image formed on the image forming element 30 of the image display device.

The observation optical system has a concave mirror for magnifying and projecting an image toward a transmissive reflective member (windshield). A schematic configuration of the HUD system is shown in FIG. 5.

As described above, in the HUD system shown in FIG. 5, an image display device (compact projector) 1 is disposed in a vehicle and an image of a trapezoid shape projected on the small screen 41 is projected onto an observation light such as a concave mirror 2 by projecting it on the windshield 3 through foe observation optical system such as the concave mirror 2 or the like, the driver 4 can recognized it as a virtual image forward of the windshield 3 with respect to the driver 4 as a reference.

FIG. 6 shows a schematic configuration of the small projector 1, and FIG. 12 shows the confirmation of the optical system. The compact projector 1 includes a light source (see FIG. 12), an image forming element 30, a projector optical system 20, and a small screen 41. A trapezoidal image is projected on the small screen 41. As the light source 11 of the image display device arranged in the automobile, a laser or an LED having a long life is preferable.

As shown in FIG. 12, the light source includes LFDs of three colors of red (11R), green (11G), and blue (11B), and the emitted divergent light is collimated by the coupling lens 18 and converts them into beams, which are combined by a dichroic mirror 19.

Since the space in which the equipment can be placed is limited within an automobile, space saving is required. In the image display device, the image forming element 30 is arranged so that the image forming surface is in a direction substantially parallel to the refractive optical system 21. In such an arrangement, the reflection on the inclined surface of the total reflection prism 22 is performed in the optical path from the image forming element 30 to being incident on the refractive optical system 21.

Therefore, the optical axis L of the refractive optical system 21 is bent by 90° in the total reflection prism 22, and then enters the image forming element 30. In such a case, it is possible to speedy the positional relationship between the short side and the long side of the trapezoidal shape image with, reference to the optical axis L. The optical axis L passes through the center of the image forming element 30 and also passes the center of the screen 40.

Next, light shielding inside the refractive optical system 21 of FIG. 12 will be described. The refractive optical system 21 includes a lens barrel 25 that houses and holds a plurality of lenses. The lens barrel 25 includes light shielding means for shielding light rays which are not projected onto the projected surface 40 among light rays incident on the refractive optical system 21 from the image forming element 30.

The light shielding means may include an aperture slop 24 for defining the brightness of the optical axis L of the refractive optical system 21 and a marginal ray shielding diaphragm 23 which shields at least a part of the light rays emitted from the region excluding the point where the optical axis L intersects the perpendicular line to the plane including the image formation surface of the image forming element 30.

In FIG. 12, the light emitted from the image forming element 30 is reflected by the inclined surface of the total reflection prism 22 and then enters the refractive optical system 21. A region (a distance from the optical axis in the direction orthogonal to the optical axis) where the light beam passes through each lens in the refractive optical system 21 is limited by the aperture stop 24 and die marginal ray shielding diaphragm 23. By shielding apart of light rays traveling toward the shorter side of the trapezoidal image inside the refractive optical system 21 against the incident light and lowering the light amount on the short side, it is possible to eliminate the imbalance in the illuminance distribution.

The marginal ray shielding diaphragm 23 is disposed at least between the aperture diaphragm 24 and the image forming element 30 and it is preferable that the light quantity of the light beam shielded by the marginal ray shielding diaphragm 23 arranged between the aperture diaphragm 24 and the image forming element 30 is larger than the light quantity of the light beam shielding by another marginal ray shielding diaphragm 23 disposed between the aperture stop 24 and the screen 40.

Light shielding by the marginal ray shielding diaphragm 23 disposed between the aperture diaphragm 24 and the image forming element 30 will be described with reference to FIGS. 13-15. In each of FIGS. 13-15, a total reflection prism 22 is omitted.

Figure 13:
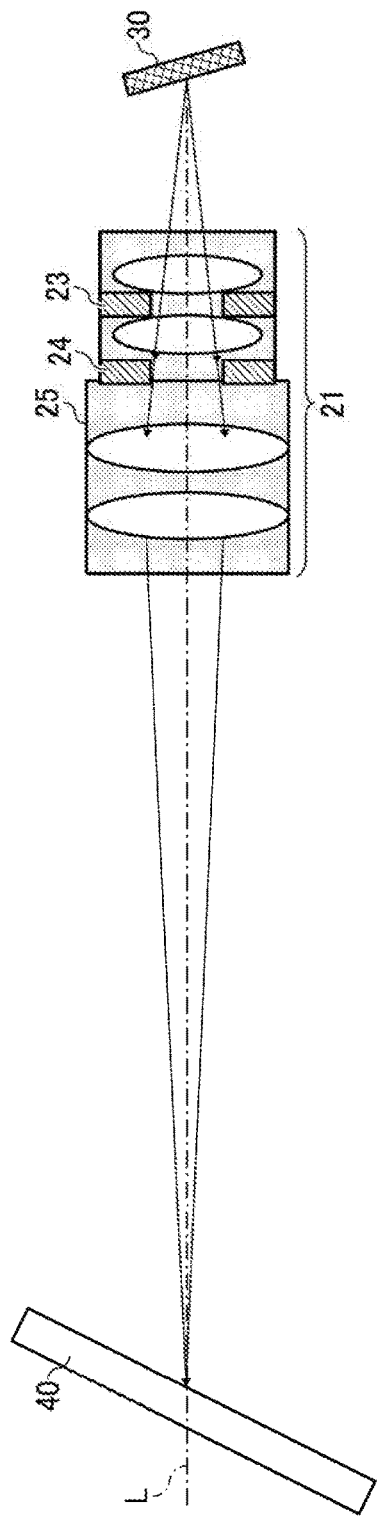
FIG. 13 is a view for explaining an example of light blocking by a light shielding unit of a lens barrel in an image display device.

A ray bundle (shown as three rays) shown in FIG. 13 is a ray bundle emitted from a point where the optical axis L of the refractive optical system 21 extends and crosses the image forming element 30. And its diameter is limited by the aperture stop 24. This light beam diameter is a basic amount that determines the brightness of the refractive optical system 21 and is called "numerical aperture" or "F value".

Figure 14:
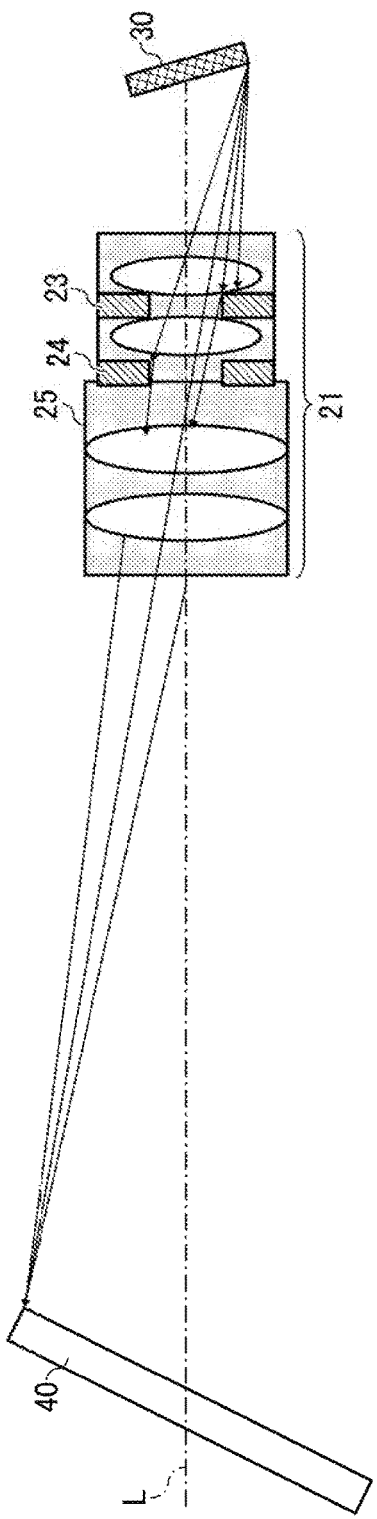
FIG. 14 is a view for explaining an example of light blocking by a light shielding unit of a lens barrel in an image display device.

The ray bundle (shown as four light rays) shown in FIG. 14 is a ray bundle incident on the refractive optical system 21 from a point deviated from the optical axis L on the image forming element 30. A part of this ray bundle is shielded by the marginal ray shielding diaphragm 23 before reaching the aperture diaphragm 24. Therefore, the ray bundle does not pass through the entire aperture diameter of the aperture stop 24, and the amount of light reaching the screen is smaller than that in FIG. 13.

By utilizing the function of the marginal ray shielding diaphragm 23 inside the refractive optical system 21, the light beam bundle on the short side of the trapezoidal shape image is positively shielded between the aperture diaphragm 24 and the image forming element 30 as shown in FIG. 14, it is possible to eliminate the illuminance imbalance.

Figure 15:
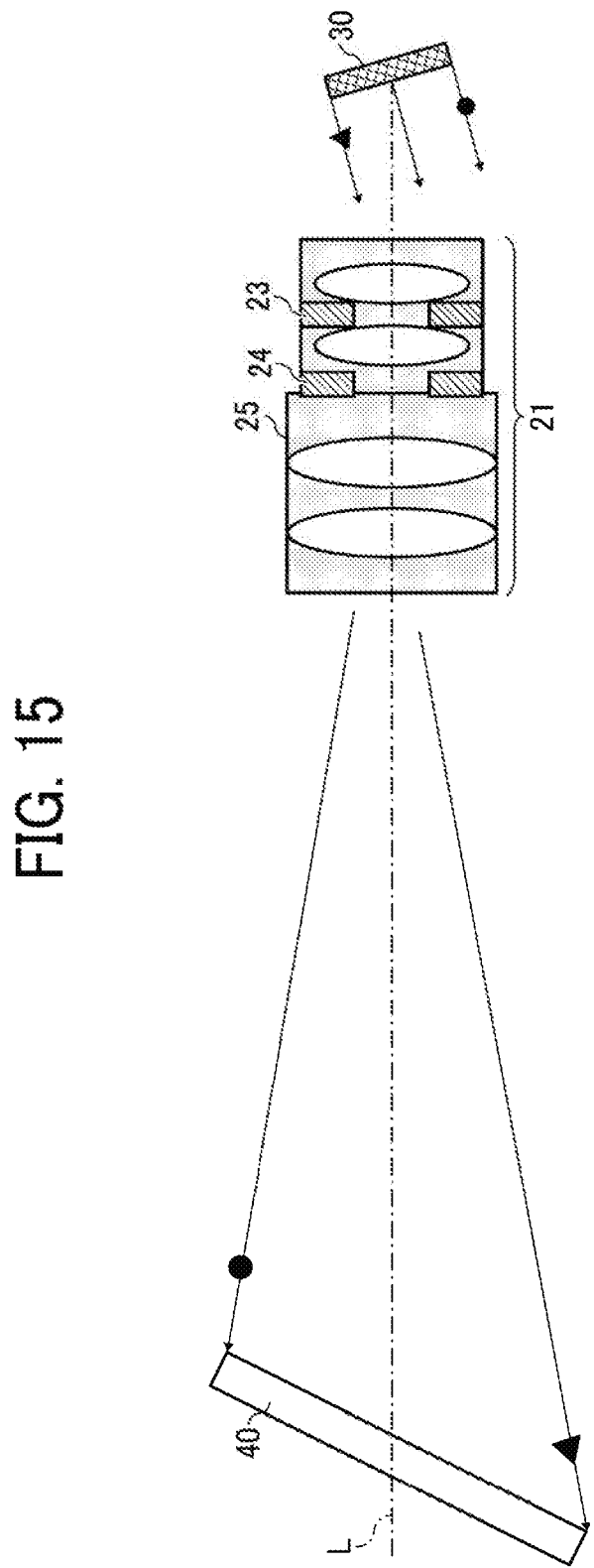
FIG. 15 is a view for explaining an example of light blocking by a light shielding unit of a lens barrel in an image display device.

Furthermore, as shown in FIG. 15, by tilting the light beam entering the refractive optical system 21 from the image forming element 30 toward the long side of the trapezoidal image projected on the screen 40 with respect to the optical axis L of the refractive optical system 21, the light shielding effect described above is further improved.

In FIG. 15, the symbol "▲" is attached to the light ray directed to the longer side of the trapezoidal shape image, and the symbol "●" to the light ray going to the shorter side. As is apparent from FIG. 15, since the amount of light shielded by the marginal ray shielding diaphragm 23 is increased by the light rays toward the shorter side, the imbalance hi the illuminance distribution of the trapezoidal image is eliminated.

In the refractive optical system 21 shown in each of FIGS. 12-15, disposing the marginal ray shielding diaphragm 23 between the aperture stop 24 and the screen 40, on the contrary, shields the light on the short side of the trapezoidal image. Therefore, it is preferable that the diaphragm disposed between the aperture stop 24 and the screen 40 has a minimum light-shielding performance such as for flare removal.

With such a configuration, for example, when the refractive optical system 21 is detached from the apparatus, the ray bundle emitted from the image forming element 30 is directed toward the long side of the trapezoidal image on the screen 40.

In addition, when comparing the amount of light emitted from one pixel of the image forming element 30 rather than the illuminance obtained by dividing the light amount by the screen area, the light amount of the light beam bundle heading toward the longer side of the trapezoidal image is larger than the light amount of the light beam bundle directed toward the short side of the trapezoidal image.

As described above, in the image display device of the present application, the focal point 16 of the condensing optical system is set at a position closer to the point corresponding to the long side of die trapezoidal shape image than the center of the image forming element 30, and by making the condenser lens 13 and fee field lens 15 lenses having positive refractive power, it is possible that the illuminance of the point corresponding to the long side of the trapezoidal image on the image forming element 30 is made higher than the illuminance of the point corresponding to the short side.

Further, depending on the angle of the folding mirror 14, it is possible to set the angle of the ray bundle reflected by the image forming element 30 toward the refractive optical system 21 (The angle toward which it is reflected after being reflected by the total reflection prism 22) to be inclined toward the long side of the trapezoidal shape with respect to the optical axis L and due to the inclination and the effect of the marginal ray shielding diaphragm 23 inside the refracting optical system 21, it is possible to bias the amount of light toward the short side and the long side of the trapezoidal image. As a result, it is possible to eliminate the imbalance in the illuminance distribution caused by the trapezoidal shape of the projected image.

The above descriptions an image display apparatus and device are just examples, and various modifications, replacements, or combinations can be made without departing from the scope Of the present disclosure by persons skilled in the art.

What is claimed is:

1. An image display apparatus comprising:
   a light source;
   an image forming element on which a plurality of micromirrors are arranged;

an illumination optical system for guiding light emitted from the light source to the image forming element; and a projection optical system having a refractive optical system including a plurality of lenses sharing an optical axis and projecting an image formed by the image forming element onto a projected surface, wherein the optical axis of the refractive optical system has an inclination of for more with respect to a perpendicular of a plane including an image forming surface of the image forming element, the image projected on the projected surface is a trapezoidal shape that includes a first portion and a second portion, the first portion is parallel to she second portion and the second portion is longer than the first portion, the illumination optical system includes a condenser lens and a field lens as a condensing optical system, the condenser lens is between the field lens and the light source, focal points of the condensing optical system are closer to the field lens than to the image forming surface of the image forming element, first rays of the light have a first focal point and interact with a first side of the image forming element, second rays of the light have a second focal point and interact with a second side of the image forming element, the first focal point is farther from the image forming element than the second focal point is from the image forming element, and the first rays form the first portion of the trapezoidal shape and the second rays form the second portion of the trapezoidal shape.

2. The image display apparatus according to claim 1, wherein a first amount of shift of the first focal point is greater than a second amount of shift of the second focal point.

3. The image display apparatus according to claim 1, wherein the projection optical system includes a total reflection prism between the image forming element and the refractive optical system, and the optical axis of the refractive optical system between the total reflection prism and the image forming element has the inclination of 1° or more.

4. The image display apparatus according to claim 1, wherein the converging optical system includes a folding mirror that changes an angle of a light beam incident on the image forming element according to the inclination of the image forming e lenient apparatus.

5. The image display apparatus according to claim 1, wherein the refractive optical system comprises a lens barrel that houses and holds the plurality of lenses, the lens barrel includes a light shield member for shielding light rays not projected on the projection surface, among light rays incident on the refractive optical system from the image forming element, and the light shield member includes an aperture stop defining the brightness of the optical axis of the refracting optical system and at least a part of the light rays emitted from a region excluding a point where the optical axis intersects the perpendicular line and a marginal ray shielding diaphragm which blocks light.

6. The image display apparatus according to claim 5, wherein the marginal ray shielding diaphragm is disposed at least between the aperture stop and the image forming element, and an amount of the light beam shielded by the marginal ray shielding diaphragm is more than an amount of the light beam shielded by another marginal ray shielding diaphragm disposed between the aperture stop and the projected surface.

7. The image display apparatus according to claim 1, wherein a light beam incident on the refractive optical system from the image forming element is inclined to the second portion of the image of the trapezoidal shape with respect to the optical axis of the refractive optical system.

8. The image display apparatus according to claim 1, further comprising:

a mirror that bends the light from the optical system and guides the light to the projected surface, wherein the mirror bends the light such that a reflectance of the first rays reaching the first portion of the image of the trapezoidal shape is smaller than a reflectance of the second rays reaching the second portion of the image of the trapezoidal shape.

9. The image display apparatus according to claim 8, wherein the first rays and the second rays have passed through the aperture center of the aperture stop of the lens barrel.

10. The image display apparatus according to claim 1, wherein the condenser lens and the field lens of the illumination optical system are lenses having positive refractive power.

11. A head-up display system comprising:

an image forming element;

an illumination optical system that guides light emitted from a light source to the image forming element;

a plurality of lenses that project a trapezoidal image formed by the image forming element; and an observation imaging optical system for forming a virtual image based on the trapezoidal image, wherein the observation optical system includes a concave mirror for enlarging and projecting the trapezoidal image toward a transmissive reflective member, the plurality of lenses have an optical axis that is at an inclination of 1° or more with respect to a perpendicular of a plane including an image forming surface of the image forming element, the trapezoidal image includes a first portion and a second portion, the first portion is parallel to the second portion and the second portion is longer than the first portion, the illumination optical system includes a condenser lens and a field lens, the condenser lens is between the field lens and the light source, first rays of the light have a first focal point and interact with a first side of the image forming element, second rays of the light have a second focal point and interact with a second side of the image forming element, the first local point and the second focal point are closer to the field lens than to the image forming surface of the image forming element, the first focal point is farther from the image forming element than the second focal point is from the image forming element, and the first rays form the first portion of the trapezoidal shape and the second rays form the second portion of the trapezoidal shape.

12. The head-up display according to claim 11, wherein a first amount of shift of the first focal point is greater than a second amount of shift of the second focal point.

13. The head-up display according to claim 11, further comprising:
a projection optical system includes a total reflection prism between the image forming element and a refractive optical system, and
the optical of the refractive optical system between the total reflection prism and the image forming element has the inclination of 1° or more.

14. The head-up display according to claim 11, further comprising:
a converging optical system including a folding mirror that changes an angle of a light beam incident on the image forming element according to the inclination of the image forming element apparatus.

15. The head-up display according to claim 11, further comprising:
a refractive optical system comprising a lens barrel that houses and holds the plurality of lenses,
the lens barrel includes a light shield member for shielding light rays not projected on the projection surface, among light rays incident on the refractive optical system from the image forming element, and
the light shield member includes an aperture stop defining the brightness of the optical axis of the refracting optical system and at least a part of the light rays emitted from a region excluding a point where the optical axis intersects the perpendicular line and a marginal ray shielding diaphragm which blocks light.

16. The head-up display according to claim 15, wherein
the marginal ray shielding diaphragm is disposed at least between the aperture stop and the image forming element, and
an amount of the light beam shielded by the marginal ray shielding diaphragm is more than an amount of the light beam shielded by another marginal ray shielding diaphragm disposed between the aperture stop and the projected surface.

17. The head-up display according to claim 15, wherein a light beam incident on the refractive optical system from the image forming element is inclined to the second portion of the image of the trapezoidal shape with respect to the optical axis of the refractive optical system.

18. The head-up display according to claim 11, further comprising:
a mirror that bends the light from the optical system and guides the light to the projected surface, wherein
the mirror bends the light such that a reflectance of the first rays reaching the first portion of the image of the trapezoidal shape is smaller than a reflectance of the second rays reaching the second portion of the image of the trapezoidal shape.

19. The head-up display according to claim 18, wherein the first rays and the second rays have passed through the aperture center of the aperture stop of the lens barrel.

20. An image display apparatus comprising:
an image forming element;
an illumination optical system that guides light emitted from a light source to the image forming element; and
a plurality of lenses that project a trapezoidal image formed by the image forming element onto a projected surface, wherein
the plurality of lenses have an optical axis that is at an inclination of 1° or more with respect to a perpendicular of a plane including an image forming surface of the image forming element,
the trapezoidal image includes a first portion and a second portion, the first portion is parallel to the second portion and the second portion is longer than the first portion,
the illumination optical system includes a condenser lens and a field lens, the condenser lens is between the field lens and the light source,
first rays of the light have a first focal point and interact with a first side of the image forming element,
second rays of the light have a second focal point and interact with a second side of the image forming element,
the first focal point and the second focal point are closer to the field lens than to the image forming surface of the image forming element, the first focal point is farther from the image forming element than the second focal point is from the image forming element, and
the first rays form the first portion of the trapezoidal shape and the second rays form the second portion of the trapezoidal shape.

* * * * *